(12) United States Patent
Moreau

(10) Patent No.: US 9,410,836 B2
(45) Date of Patent: Aug. 9, 2016

(54) DOSING DEVICE

(71) Applicant: BAYER CROPSCIENCE AG, Monheim am Rhein (DE)

(72) Inventor: Fabrice Moreau, Tassin la demi Lune (FR)

(73) Assignee: Bayer CropScience AG, Monheim (DE)

( * ) Notice: Subject to any disclaimer, the term of this patent is extended or adjusted under 35 U.S.C. 154(b) by 0 days.

(21) Appl. No.: 14/394,588

(22) PCT Filed: Apr. 18, 2013

(86) PCT No.: PCT/EP2013/058120
§ 371 (c)(1),
(2) Date: Oct. 15, 2014

(87) PCT Pub. No.: WO2013/160193
PCT Pub. Date: Oct. 31, 2013

(65) Prior Publication Data
US 2015/0060498 A1     Mar. 5, 2015

(30) Foreign Application Priority Data

Apr. 26, 2012  (EP) .................................. 12165735

(51) Int. Cl.
*G01F 11/26* (2006.01)
*B65D 50/04* (2006.01)

(52) U.S. Cl.
CPC ............... *G01F 11/26* (2013.01); *G01F 11/263* (2013.01); *B65D 50/041* (2013.01)

(58) Field of Classification Search
CPC ..... G01F 11/26; G01F 11/262; G01F 11/263; B65D 50/00; B65D 50/04; B65D 50/041
See application file for complete search history.

(56) References Cited

U.S. PATENT DOCUMENTS

| | | | | |
|---|---|---|---|---|
| 4,079,859 A | * | 3/1978 | Jennings | .......................... 222/1 |
| 4,474,301 A | * | 10/1984 | Davis | .................. B65D 50/041 |
| | | | | 215/220 |
| 4,690,313 A | | 9/1987 | Luine et al. | |
| 5,611,443 A | * | 3/1997 | King | .................... B65D 50/041 |
| | | | | 215/220 |
| 6,085,920 A | * | 7/2000 | Moretti | .................. B65D 41/34 |
| | | | | 215/220 |
| 7,111,746 B2 | * | 9/2006 | Miceli | .................. B65D 50/041 |
| | | | | 215/219 |

FOREIGN PATENT DOCUMENTS

| | | |
|---|---|---|
| DE | 865810 C | 2/1953 |
| EP | 0335505 A1 | 10/1989 |
| EP | 0793081 A1 | 9/1997 |
| EP | 2243721 A1 | 10/2010 |
| FR | 2593143 A1 * | 7/1987 ............. B65D 25/52 |

OTHER PUBLICATIONS

International Search Report from corresponding PCT/EP2013/058120, mailed Aug. 16, 2013.

* cited by examiner

*Primary Examiner* — Nicholas J Weiss
(74) *Attorney, Agent, or Firm* — McBee Moore Woodward Vanik IP LLC

(57) ABSTRACT

The invention relates to a dosing device. The dosing device comprises a storage container with a storage chamber disposed therein for accommodating a filling material, a dosing container with a dosing chamber disposed therein, an outlet with an outlet opening for dispensing the filling material, a closure member by means of which the outlet opening can be closed, and a valve wherein the valve is able to assume a dispensing position and a dosing position.

16 Claims, 7 Drawing Sheets

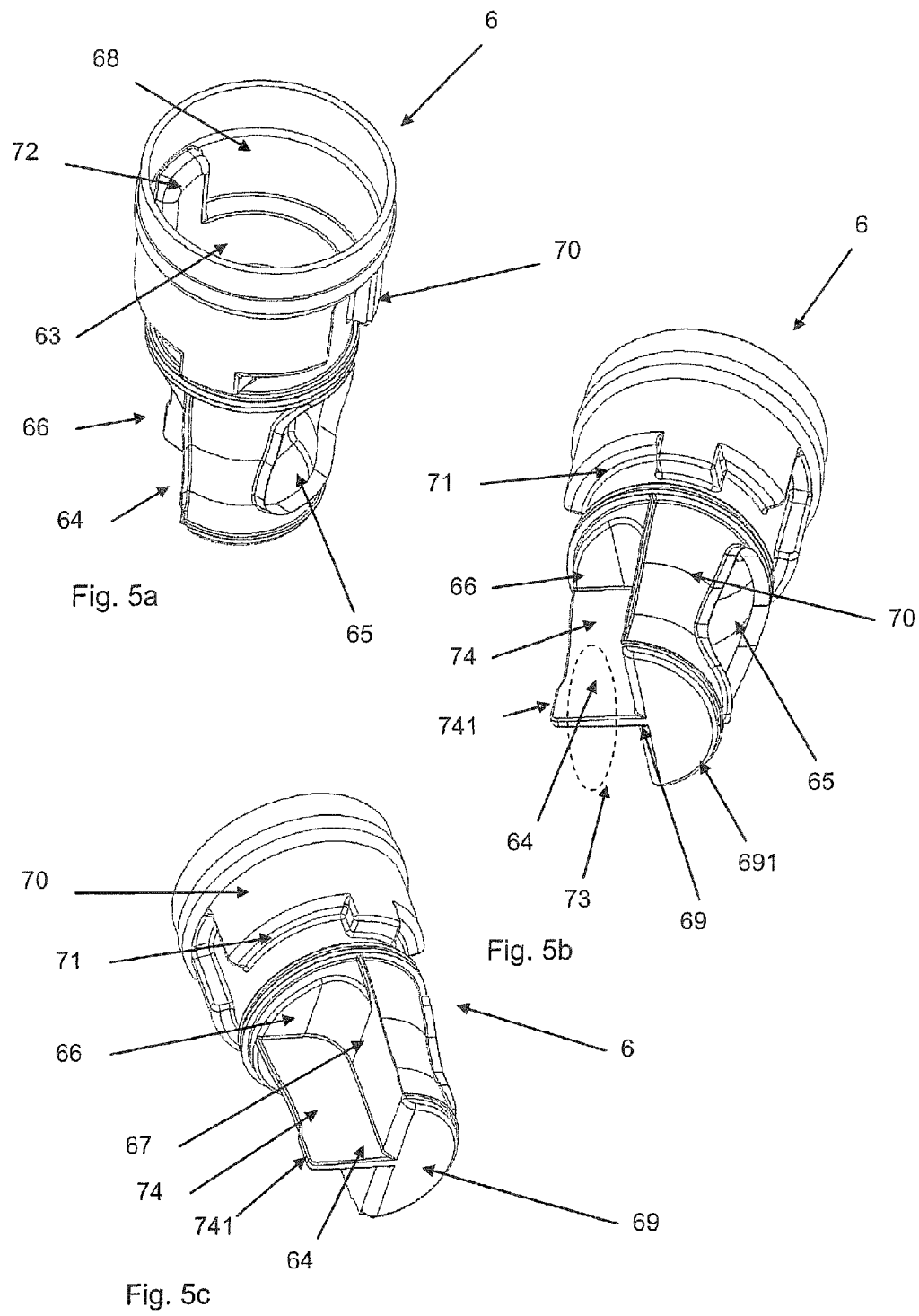

DOSING DEVICE

The invention relates to a dosing device comprising a storage container and a dosing container. The dosing device is provided for dispensing a filling material in a storage chamber of a storage container in a dosed manner.

For this purpose, a part of the filling material is usually transferred first from the storage chamber into a dosing chamber of the dosing container. This process is repeated until the quantity of the filling material desired by the user has been accommodated in the dosing chamber. Then, this quantity of filling material is removed from the dosing chamber by being discharged to the outside through an outlet opening on an outlet of the dosing device.

Typically, the dosing device additionally comprises a closure member which is supposed to prevent the inadvertent discharge of the filling material by closing the outlet opening.

Such a dosing device is known from EP 2 243 721 A1. This dosing device comprises a storage container and a dosing container, with the storage chamber for accommodating the filling material, which is disposed in the storage container, being connected to the dosing chamber disposed in the dosing container via a dosing conduit. An outlet and a closure member arranged thereon are disposed on the dosing container. Furthermore, the dosing device comprises a valve. The valve is configured in such a way that it can shut or open the dosing conduit. The closure member is coupled to the valve in such a way that, if the dosing conduit is open, the closure member is locked with the outlet.

The dosing chamber of the dosing device of EP 2 243 721 A1 has an irregular design which is due, among other things, to the arrangement of the outlet directly on the dosing chamber. Determining the filling level is difficult even if a fill level indicator is provided, because the dosing device has to stand upright on a supporting surface for this purpose. However, filling the dosing chamber takes place by inclining the dosing chamber, with the dosing chamber being filled more in the case of great inclination than in the case of small inclination. In order to achieve an exact filling level, the dosing device must be placed upright again and again after having been inclined, in order to read off the filling level.

Another drawback of the dosing device from EP 2 243 721 A1 is the complicated structure of the closure member, which has to be constructed from several components in order to establish the coupling with the valve. Another drawback of this solution is the fact that, when the filling material is filled from the storage chamber into the dosing chamber (i.e. during dosing), the outlet is accessible from the storage chamber at certain angle positions of the valve. In the case of improper use of the dosing device, in particular of the closure member, the filling material, in unfavorable circumstances, may escape to the outside through the outlet.

It is therefore the object of the present invention to provide a dosing device whose design enables as symmetrical a shape of the dosing chamber as possible, which results in advantages in estimating the filling level of the filling material located in the dosing chamber if the dosing device is inclined, and which furthermore is as well secured as possible against an inadvertent discharge of the filling material during the dosing process, and at the same time has as simple a design as possible.

According to the invention, the object is achieved by a dosing device which comprises a storage container with a storage chamber disposed therein, a dosing container with a dosing chamber disposed therein, an outlet with an outlet opening for discharging a filling material, and a valve. The valve can assume a dosing position allowing the filling material to be transferred between the storage chamber and the dosing chamber, and a dispensing position allowing the filling material to be dispensed from the dosing chamber. According to the invention, it is provided that the valve, in the dosing position, opens a dosing connection between the dosing chamber and the storage chamber and shuts an outlet passage from the dosing chamber to the outlet opening, and the valve, in the dispensing position, shuts the dosing connection and opens the outlet passage. In this way, it can be accomplished that the filler cannot arrive inadvertently at the outlet opening during dosing, i.e. during the filling of at least part of the filling material, which is preferably provided in liquid, powdery or granulate form, from the storage chamber into the dosing chamber. In this case, it must be noted that the teaching of the present invention does not presume a complete closure of the dosing connection or the outlet passage because a complete seal of the valve is virtually unattainable. Rather, the closure is always seen in the context of criteria that can be technically realized. The dosing device further comprises a valve seat for accommodating the valve, with the valve seat having a cylindrical basic shape defined by two end faces in form of discs and a side surface connecting the two end faces. A connecting conduit between the dosing container and the valve seat opens out into the side surface of the valve seat. In particular, it can thus be avoided that the outlet is disposed directly on the dosing container, so that the dosing chamber can be given a symmetrical shape.

According to the present invention the dosing device comprises a closure member, with which the outlet opening can be closed off, wherein the closure member is coupled to the valve in such a way that rotation of the closure member displaces the valve between the dosing position and the dispensing position, wherein the closure member is coupled to the valve and the outlet in such a way that the closure member is locked with the outlet as long as the valve is in its dosing position and that the closure member is not locked with the outlet when the valve is in its dispensing position.

As the closure member with which the outlet opening can be closed off and which is coupled to the valve in such a way that the closure member is locked with the outlet as long as the valve is in its dosing position, the outlet opening remains closed by the closure member for as long as the filling material is able to come from the storage chamber to the dosing chamber via the dosing connection. An additional safeguard against an inadvertent discharge of the filling material can be accomplished by means of such a coupling. In this case, the closure member can for instance be configured as a removable closure cap.

Furthermore, it is advantageous to arrange the valve so as to be rotatable in the cylinder-like valve seat. Preferably, the valve can be rotated between its dosing position and dispensing position.

Moreover, the closure member is according to the present invention configured as a rotary closure member. A coupling is provided between the closure member and the valve. For example, the coupling may be such that the closure member can be non-rotatably connected to the valve. By this it can be achieved that the valve is co-displaceable during rotation of the closure member. Thus, a user of the dosing device is able to bring the valve into the dosing position or dispensing position by rotating the closure member, which is usually disposed so as to be easily accessible for him.

Preferably, a rotary movement of the valve, which is rotatably disposed in the valve seat, is limited. For example, the valve can be arranged in such a way that the dosing position of the valve is offset relative to its dispensing position by a certain angle, for example 30 degrees, 45 degrees or 90 degrees, with another angle also being possible. Preferably, the movement of the valve is limited in such a way that the valve is able to carry out a rotation substantially over the predetermined angle. Particularly preferably, the limitation of the rotary movement of the valve is achieved by means of cooperating protrusions or cut-outs that are respectively formed in the valve seat or the valve. For example, the valve seat can have a protrusion extending in the circumferential direction over a first angle range, and the valve can have a cut-out extending in the circumferential direction over a second angle range. Two edges that are spaced apart in the circumferential direction are formed on the valve seat by the protrusion, and correspondingly, two further edges that are spaced apart in the circumferential direction are formed on the valve by the cut-out. A limitation of the rotary movement is then accomplished by a positive fit in the direction of rotation between, respectively, one edge on the valve seat and one edge on the valve, with such a positive fit being created at two different angle positions of the valve. Correspondingly, the limitation of the rotary movement of the valve can also be accomplished by a cut-out on the valve seat and a protrusion on the valve.

Preferably, the closure member is provided with a recess and the valve with an appendage. Due to a positive fit in the direction of rotation, the recess and the appendage can cooperate, so that a rotation of the closure member can cause a corresponding rotation of the valve. In this way, the coupling between the closure member and the valve can be realized advantageously. It is also possible to provide, in a corresponding manner, an appendage on the closure member and a recess on the valve in order enable the coupling.

Preferably, the outlet of the dosing device has a cylindrical basic shape, with the outlet opening being disposed in the area of an end face of the cylindrical outlet.

According to a preferred embodiment, an external thread, which extends in the circumferential direction of the outlet, is disposed on the outside of the outlet. The external thread of the outlet fits together with an internal thread of the closure member, which extends in the circumferential direction inside the closure member. The closure member is locked with the outlet by screwing the internal thread of the closure member onto the external thread of the outlet. Accordingly, the closure member is unlocked from the outlet by unscrewing the internal thread of the closure member from the external thread of the outlet.

Alternatively, the outlet is provided on its outside with a web extending in the circumferential direction and the closure member is provided with a lug. The lug is provided for latching behind the web in at least one angle position of the closure member. Due to a positive fit in the cylindrically axial direction of the outlet between the web and the lug, a relative movement of the closure member relative to the outlet is limited in this direction, whereby a corresponding lock can be achieved. Similarly, the lock can be accomplished by a groove formed in the outlet/closure member and a web formed in the closure member/outlet.

According to a preferred form of the invention, filling the filling material from the storage chamber into the dosing chamber is carried out by inclining the dosing device around a pivot axis. A particular advantage of the invention lies in the fact that the filling material can be dispensed by inclining the dosing device around the same or a parallel pivot axis.

Another preferred embodiment of the invention provides that the valve is formed in the form of a sleeve with a substantially cylindrical basic shape. In this case, the sleeve has four openings in a sleeve wall of the sleeve. The four openings are divided into two pairs associated with each other, with through connections being formed within the sleeve only between those openings that are associated with each other.

Particularly preferably, the valve has a first and a second end face as well as a casing and an inner space, wherein inner space relates to the basic shape of the valve, and the inner space is at least partially enclosed by the casing. These embodiments moreover provide that the first end face comprises a first opening, the second end face a second opening, and the casing a third and fourth opening. Moreover, the inner space of the valve comprises two partial spaces: the first and the second space. In this case, the first space is separated from the second space by a partition wall disposed in the inner space. In this case, the partition wall can have any suitable shape. The inner space is divided in such a way that each of the spaces is accessible from outside the inner space by two of the for openings, respectively: The first space is accessible through the first and third opening, the second space through the second and fourth opening. Conversely, the first space is preferably not accessible through second and fourth opening, and correspondingly, the second space is not accessible through the first and third opening. In this way, two conduits are created in the inner space of the valve that are separate from each other and whose ends are formed in each case by two openings in the casing of the valve. In any case, the two openings at the ends of a conduit do not necessarily have to be separate from each other, so that they also can be considered a single opening extending over an end face and the casing.

According to an advantageous embodiment of the invention, the storage container and the dosing container are configured as a single piece, which can entail the advantage of a simple design. The outlet and/or the valve seat can also be formed as one piece with the storage container and/or the dosing container. It is particularly advantageous to form all parts of the dosing device as one piece, with the exception of the closure member and/or the valve. The materials suitable for producing the dosing device are primarily plastics. Particularly advantageously, at least the storage container and the dosing container are made from a transparent or semi-transparent material.

Preferably, the dosing container comprises a fill level indicator. The fill level indicator serves for indicating the quantity of the part of the filling material located in the dosing chamber. It is particularly advantageous if the fill level indicator includes a marking line, with the marking line being adapted to the shape of the dosing chamber in such a way that the same filling level of the filling material in the dosing chamber is indicated by the marking line for a plurality of angles of inclination, preferably for all angles of inclination of an angle range, around the pivot axis of the dosing device. For example, if the dosing chamber has a cylindrical basic shape, the marking line can have an approximately circular form. If the fill level indicator comprises several marking lines, they can in that case preferably be realized as concentric partial circle sections. The marking line can be comprised of a single line section or of several line sections and/or marking points.

It is also advantageous to provide the closure member with a child-proof lock. In this case, the child-proof lock can be realized, for example, by a special design of the closure member, wherein the closure member can be unlatched from the outlet by a simultaneous actuation of at least two different mechanisms on the closure. As the closure member is configured as a rotary closure member, a rotation of the rotary closure member while at the same time pressing it down in the axial direction can be required for unlocking. Therefore, in the case of the embodiment of a non-rotatable connection between the closure member and the valve described above, only parts of the closure member may be non-rotatably connected to the valve, whereas other parts of the closure member are connected to the valve in a non-rotatable manner not until additional measures, such as the above mentioned pressing down in an axial direction, are taken.

The invention is explained in more detail below with reference to the FIGS. 1 to 6, in which FIG. 1 shows a schematic outline of an embodiment of a dosing device according to the invention;

FIGS. 5a to 5c show different perspective views of a valve of the dosing device of FIG. 3;

Figure 1:
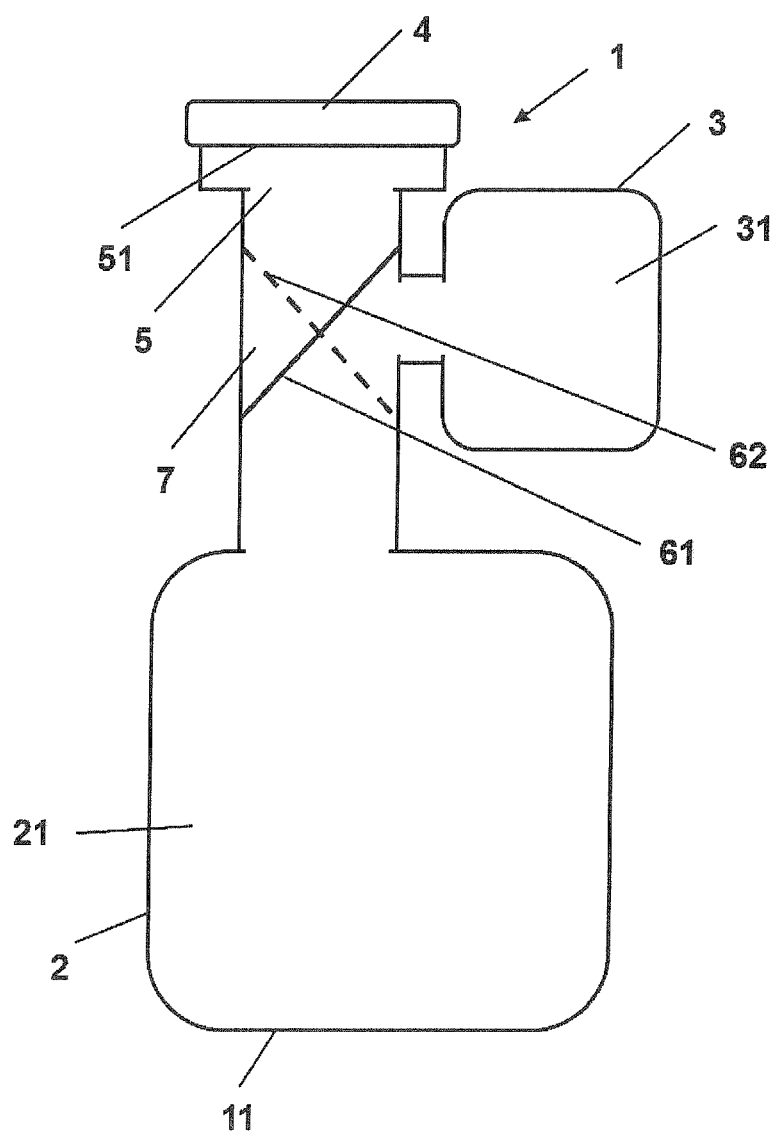

In detail, FIG. 1 shows a schematic outline of a dosing device 1 according to the invention. The dosing device 1 comprises a storage container 2 with a storage chamber 21 disposed therein, a dosing container 3 with a dosing chamber 31 disposed therein, a closure member 4 by means of which an outlet opening of an outlet 5 can be closed, and a valve seat 8. Furthermore, the dosing device 1 comprises a valve 6 (see also FIG. 3 for example) which, however, is depicted in a very schematic way only as a continuous line 61 or as an interrupted line 62. A so-called dosing position of the valve 6 is indicated by means of the continuous line 61, whereas the interrupted line is supposed to represent a dispensing position of the valve 6. If the valve is in the dosing position (continuous line 61), then the filling material (not shown) can move from the storage chamber 21 to the dosing chamber 31 and vice versa. However, in this position of the valve 6, the filling material is substantially unable to arrive at the outlet opening 51 (the incomplete tightness of the valve having to be taken into account in this case). If the valve is in the dispensing position (interrupted line 62), then the filling material can move from the dosing chamber 31 to the outlet 5, but not to the storage chamber 21. At the same time, a part of the filling material that is located in the storage chamber 21 cannot arrive at the outlet 5.

Figures 2A, 2B, 2C:
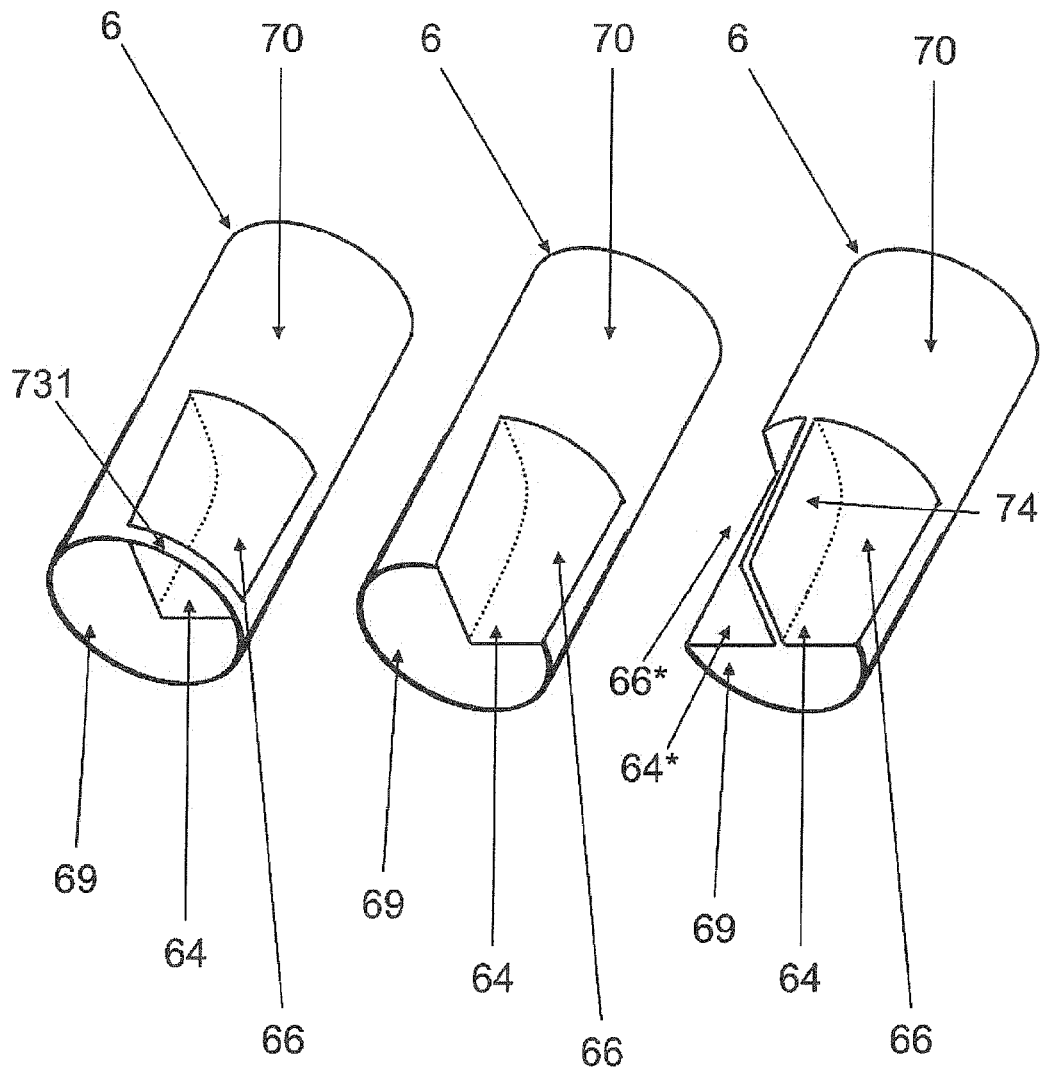
FIGS. 2a, 2b and 2c show a schematic outline of different embodiments of the lower part of a valve according to the invention.

FIGS. 2a, 2b and 2c show schematic outlines of three different examples of embodiments of the lower part of the valve 6 of the dosing device 1 according to the invention. FIGS. 2a-c are intended to illustrate the arrangement of openings 64 and 66 in the valve 6 in more detail.

Components or features in FIGS. 2a-c that are completely or partially identical are provided with the same reference numerals.

The valve 6 of FIGS. 2a-c has the basic shape of a cylinder, with a substantially circular-disc-shaped first end face (not visible), a second substantially circular-disc-shaped end face 69 and a casing or side surface 70 connecting the two circular-disc-shaped end faces.

In FIG. 2a the opening 64 is disposed in the second end face 69 and the opening 66 is disposed in the side surface 70. The both openings 64 and 66 are separated by a peripheral rim 731.

In FIG. 2b the opening 64 is disposed in the second end face 69 and the opening 66 is disposed in the side surface 70. However, in FIG. 2b the opening 64 and the opening 66 transition into one another, so that these two openings may also be considered as one opening in the side surface 70.

FIG. 2c shows another embodiment of the valve 6, where, similarly to FIG. 2b, the opening 64 is disposed in the second end face 69 and the opening 66 is disposed in the side surface 70 such that the opening 64 and the opening 66 transition into another. In addition, in the embodiment of FIG. 2c the pair of openings 64, 66 are separated from a further pair of openings 64*, 66* by a web 74.

In a preferred embodiment of the invention the valve 6 in the FIGS. 2a-c comprises two further openings 63 and 65 (see FIG. 4a for example), opening 63 defined in the first end face of the valve 6, opening 65 defined in the side surface 70 of the valve 6, which are not visible in the representation of the valve 6 as shown in FIGS. 2a-c.

Figure 3:
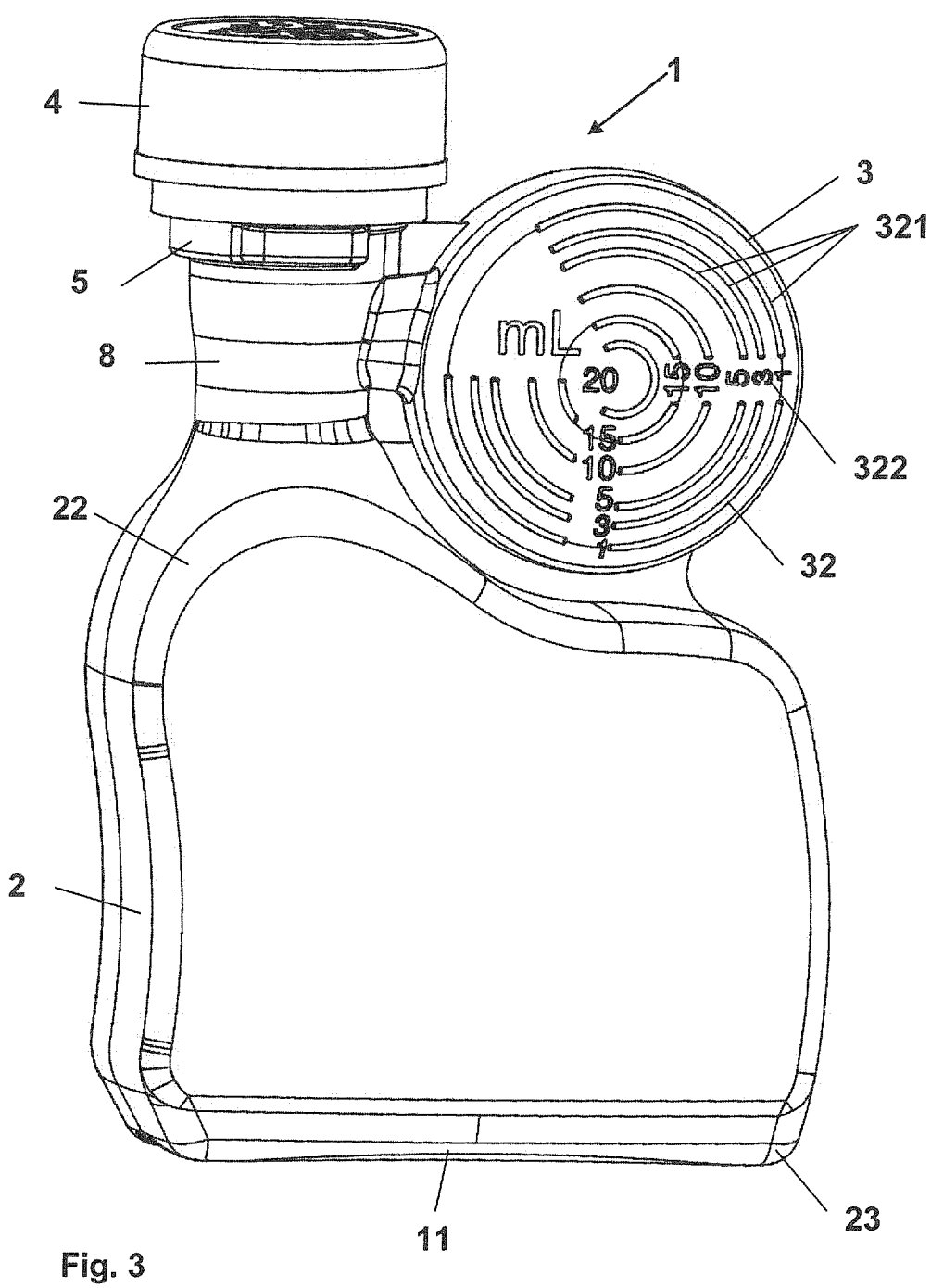
FIG. 3 shows an outside view of another embodiment of a dosing device according to the invention.

FIG. 3 shows a preferred embodiment of the dosing device 1 according to the invention. Components or features that are completely or partially identical to components or features in FIGS. 1 and 2 are provided with the same reference numerals. This also applies, mutatis mutandis, to the further Figures. In the description of the exemplary embodiment, reference is made below to the FIG. 3 as well as to the FIGS. 4 to 6, which depict the exemplary embodiment and individual components thereof in different perspectives.

In the case of the dosing device 1 of FIG. 3, the storage container 2 is substantially formed to be rectangular, with the storage container 2 transitioning via a sweeping expanded portion 22 into the valve seat 8. Corners 23 of the storage container 2 are rounded. The dosing container 3 is disposed laterally of the expanded portion 22 or the valve seat 8. Thus, the dosing container 3 and the valve seat 8 have approximately the same vertical height relative to a supporting surface 11 of the dosing device. A connecting conduit 8 extending between the dosing container 3 and the valve seat 8 extends substantially horizontally.

The dosing container 3 comprises a cylindrical basic shape with rounded-off corner areas 34, with a cylinder axis 33 of the dosing container 3 extending in the horizontal direction, provided the dosing device 1 is placed on a non-inclined surface. The axial extension of the dosing container 3 is smaller than the extension in the radial direction. In other words: In this exemplary embodiment, the height of the substantially cylindrical dosing container is smaller than its diameter, in this case approximately half as small.

With its cylindrical shape, the dosing chamber 31 is configured particularly symmetrically, so that marking lines 321 are provided on the dosing container 3 that are configured in the form of concentric partial circle sections on both end faces 35 (only one of which can be seen in the Figures). In this way, the filling level of a part of the filling material located in the dosing chamber can be shown for a plurality of inclination angles around the cylinder axis 33 or a parallel pivot axis, i.e. for an angle range of about 270 degrees. One of the marking lines 321 in this case indicates the same filling level for all inclination angles. Moreover, a measurement value 322 in ml that denotes the filling level indicated by the marking line 321 is assigned to each of the marking lines 321.

Beginning at the starting position of the dosing device 1, in which the cylinder axis 33 extends horizontally, a part of the filling material can be transferred from the storage chamber into the dosing chamber or vice versa by inclining the dosing device 1 around a pivot axis parallel to the cylinder axis 33. The filling material can also be dispensed from the dosing chamber via the outlet opening 51 to the outside by inclining the dosing device 1 around a parallel pivot axis.

Figure 4:
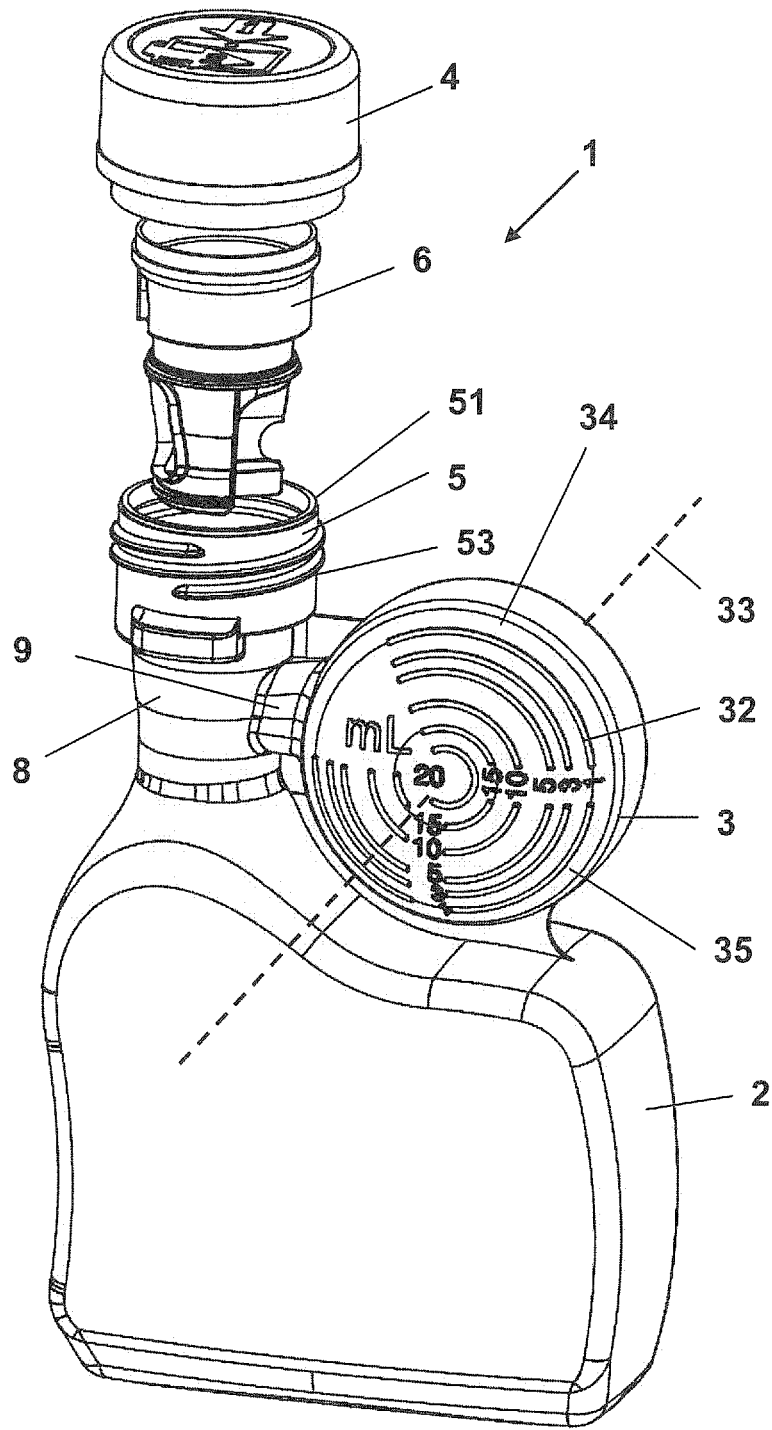
FIG. 4 shows an exploded view of the dosing device of FIG. 3.

At the same time, the illustration of the dosing device in FIG. 4 makes clear that pivot axes parallel to the cylinder axis 33 are, of course, not the only pivot axes around which the dosing device can be inclined for dosing out/dispensing the filling material. However, in order to be able to read off the filling level of the filling material 31 correctly by means of the marking lines, the dosing device needs to be oriented in such a way that the cylinder axis 33 runs parallel.

The closure member 4 is configured as a rotary closure member closing off the outlet 5. The valve seat 8 forms a rotatable support for the valve 6. Furthermore, the closure member 4 is provided with a child-proof lock. For this purpose the closure member is formed of two parts. An inner part of the closure member is rotatably and movably mounted on an outer part of the closure member 4. If the closure member 4 is located on the outlet 5 when the dosing device 1 is in the upright position (the position shown, in particular, in the FIG. 6a,b), then, however, protrusions or recesses disposed on the outer part and pointing towards the inner part can be caused, by pressing down the outer part of the closure member 5 against the spring force of a spring member disposed on the outer part, to latch into recesses or protrusions that correspond to them, are disposed on the inner part and point towards the outer part, and to establish a positive fit with them in the circumferential direction, so that a rotation of the outer part of the closure member 4 causes a rotation of the entire closure member 4. Accordingly, two manipulations are required for opening the dosing device 1 (pressing down while at the same time rotating the closure member 4), which makes access to the contents of the dosing device more difficult for an infant.

Furthermore, the outlet 5 has a cylindrical basic shape. An upper end face of the outlet 5 constitutes an outlet opening 51. The filling material is dispensed from the dosing chamber 31 to the outside via the outlet opening 51.

An external thread 53, which extends in the circumferential direction of the outlet 5, is disposed on the outside of the outlet 5. The external thread 53 of the outlet 5 fits together with an internal thread (not shown) of the closure member 4, which extends in the circumferential direction inside the closure member 4. The closure member 4 is locked with the outlet 5 by screwing the internal thread of the closure member 4 onto the external thread 53 of the outlet 5. Accordingly, the closure member 4 is unlocked from the outlet 5 by unscrewing the internal thread of the closure member 4 from the external thread 53 of the outlet 5.

As an alternative to the external thread 53 disposed on the outside of the outlet 5 and the internal thread inside the closure member 4, two webs which extend in the circumferential direction of the outlet 5 are disposed on the outside of the outlet 5. In each case, the webs extend over less than half the length of the circumference of the outlet 5. Two gaps in the circumferential direction are thus created between the webs. Given a suitable angle position of the closure cap 4, two lugs disposed on the closure cap latch behind the two webs, so that a positive fit in the axial direction of the outlet 5 is created between one lug and one web, respectively. In this angle position, the closure member 4 thus locks with the outlet 5. Removing the closure member 4 from or placing it on the outlet 5 is thus possible only at a certain angle position, i.e. in which the lugs on the closure cap 4 overlap the gaps if the closure cap 4 is in place.

The valve seat 8 of the dosing device 1 is configured to accommodate the valve 6. The valve 6 is rotatably mounted in the valve seat 8.

Each of the FIGS. 5a, 5b and 5c shows an enlarged perspective view of the valve 6 of the dosing device 1 shown in FIGS. 3 and 4. The valve 6 roughly has the basic shape of a cylinder, with a substantially circular-disc-shaped first end face 68, a second substantially circular-disc-shaped end face 69 (in FIG. 6b, the circumference of the second end face 69 is indicated by a dashed line 73), a casing 70 connecting the two circular-disc-shaped end faces, as well as an inner space limited by the two end faces 68, 69 and the casing 70. The second end face 69 comprises a half-circular closed part and a half-circular open part. The half-circular open part is divided by an edge of a web 74 into two quarter-circular open parts.

A first circular opening 63 is disposed in the first end face. A second opening 64 is disposed in the second end face and is defined by one of the quarter-circular open parts. The quarter-circular opening 64 has no rim on the circumference (see dashed line 73). Two further openings 65, 66 are disposed in the casing. In a preferred embodiment of the valve 6, the second opening 64 and the fourth opening 66 transition into one another, so that these two openings may also be considered as one opening in the casing 70. In other embodiments, different openings can merge with each other, or also, all four openings can be separated from one another by casing material. For example, it is conceivable that a peripheral rim is provided in the area of the dashed line 73, which would mean a separation of the opening 64 and the opening 66.

In addition to the openings 63, 64, 65 and 66 the valve 6 comprises two further openings: one defined in the casing 70 of the valve 6 adjacent to the fourth opening 66 and separated from the fourth opening 66 by the web 74, and one defined in the second end face 69 by the second of the quarter-circular open parts, wherein this opening is separated from the second opening 64 by an edge of the web 74. As shown by this example, the valve 6 may comprise more than the four openings 63, 64, 65, 66 which, however, provide the functionality to form channels though the valve 6. The object of the web 74 and particular of the edge 741 is mainly to hold the valve 6 in place in respect to the valve seat 8 in order to prevent the opening 65 to leak in every position of the dosing device. Consequently, also without the web 74 the valve would comprise the openings 64, 66, with the openings 64, 66 extending in this case over a range of a half circle (180°)

The inner space comprises a first and the second space. The first space is accessible from the outside through the first opening 63 and the third opening 65. The second space is open towards the outside due to the second opening 64 and the fourth opening 66 and, in the inner space, is separated from the second space by the partition wall 67.

The web 74 with a lower edge 741, whose end, viewed in the radial direction, lies on the peripheral dashed line 73, extends perpendicularly to the dividing wall 67. The edge 741 and a rim 691 of a closed part of the second end face 69 lie on a same circumference, wherein, in the position of use of the valve 6, the edge 741 and the rim 691 rest on the valve seat 8, thus ensuring a non-tilting arrangement of the valve 6 in the valve seat 8.

If the valve 6 is in the dosing position, the fourth opening 66 faces the dosing chamber 31 or the connecting conduit 9. In this position, the filling material contained in the storage chamber 21 can be transferred from the storage chamber 21 through the second opening 64, the second space and the fourth opening 66 of the valve 6 into the dosing chamber 31 by inclining the dosing device 1. The partition wall 67 prevents the filling material from entering the first space in the process.

If the valve 6 is in the dispensing position, the third opening 65 faces the dosing chamber 31. In this position, the filling material may be able to enter the second space from the storage chamber 21 through the second opening 64, but the partition wall 67 prevents the filling material from being able to enter the first space. In contrast, the part of the filling material located in the dosing chamber 31 can enter the first space through the third opening 65 and thence can arrive at the outlet 5 through the first opening 63.

By rotating the valve 6 by about 90 degrees around the cylinder axis of the cylindrical basic shape of the valve 6, the valve 6 is transferred from the dosing position into the dispensing position. A corresponding rotation in the reverse direction causes a transition from the dispensing position into the dosing position of the valve 6. A rotation of the valve 6 by considerably more than 90 degrees from the dosing position, or of −90 degrees from the dispensing position, is prevented by a positive fit in the circumferential direction which a cut-out 71 of the valve 6 establishes with a protrusion disposed on the valve seat 8.

The valve 6 moreover comprises an appendage 72. The appendage 72 is provided for cooperation with a recess of the closure member 4 by positive fit in the circumferential direction. A non-rotatable coupling of the closure member 4 to the valve 6 is thus accomplished, so that by means of a rotation of the closure member 4 a corresponding rotation of the valve 6 can be caused.

Figure 6A:
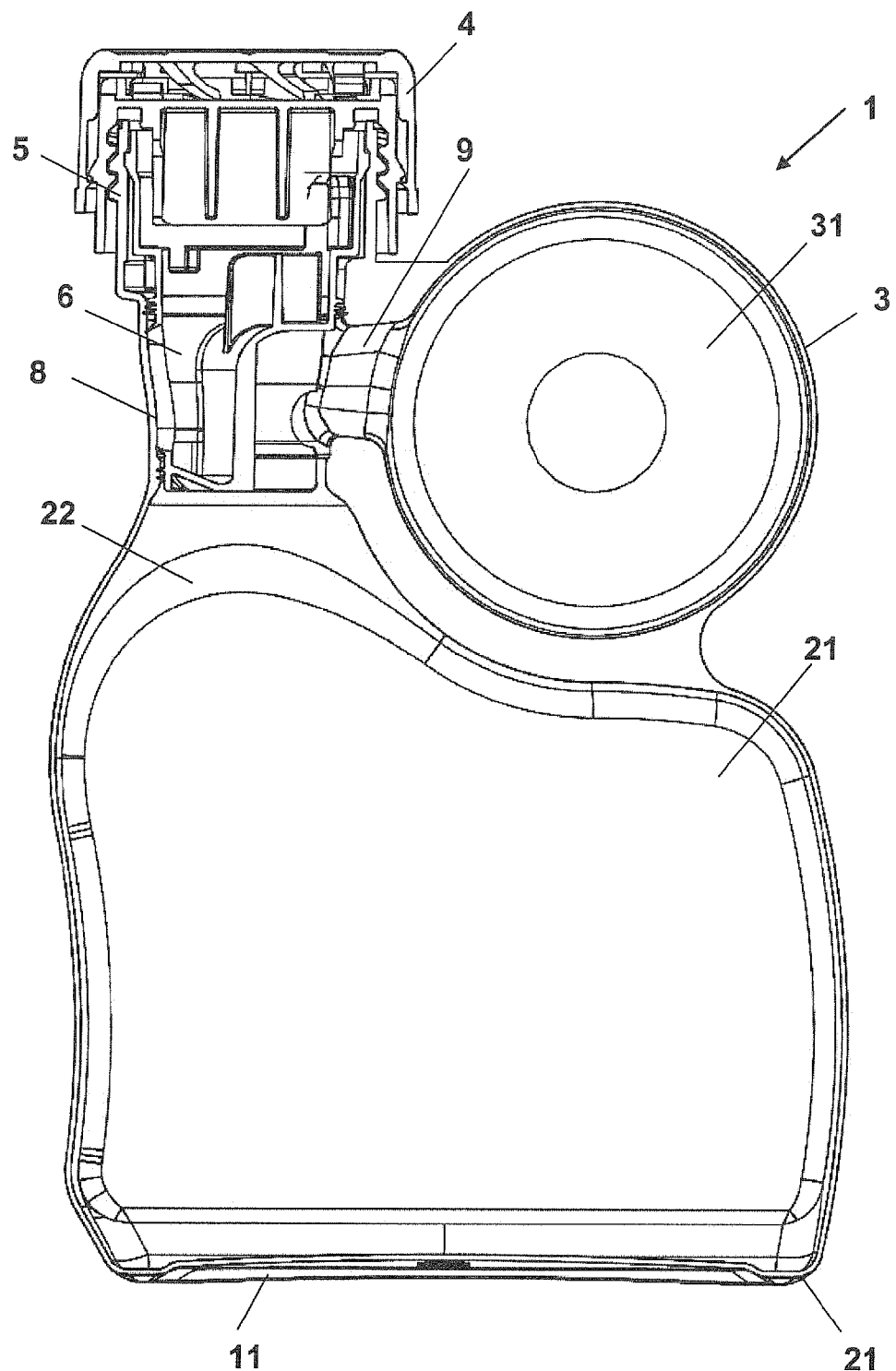
FIGS. 6a and 6b show cross sectional views of the dosing device of FIG. 3.

FIG. 6a shows the dosing device 1 in a cross-sectional side view. In this illustration, the valve 6 assumes its dosing position. In the dosing position of the valve 6, the fourth opening 66 points in the direction of the dosing chamber 31 or of the connecting conduit 9. Thus, at least a part of the filling material located in the storage chamber 21 can come into the dosing chamber 31 from the storage chamber 21 via an opened dosing connection between the storage chamber 21 and the dosing chamber 31. The opened dosing connection is in this case formed by the second opening 64 of the valve 6, the second space in the inner space of the valve and the fourth opening 66 of the valve 6. The partition wall 67, which divides the inner space of the valve 6 into two spaces, at the same time shuts off an outlet passage from the storage chamber 21 or the dosing chamber 31 to the outlet 5, and in particular to the outlet opening 51.

In the dosing position of the valve 6, the closure member 4 is additionally locked with the outlet 5.

Figure 6B:
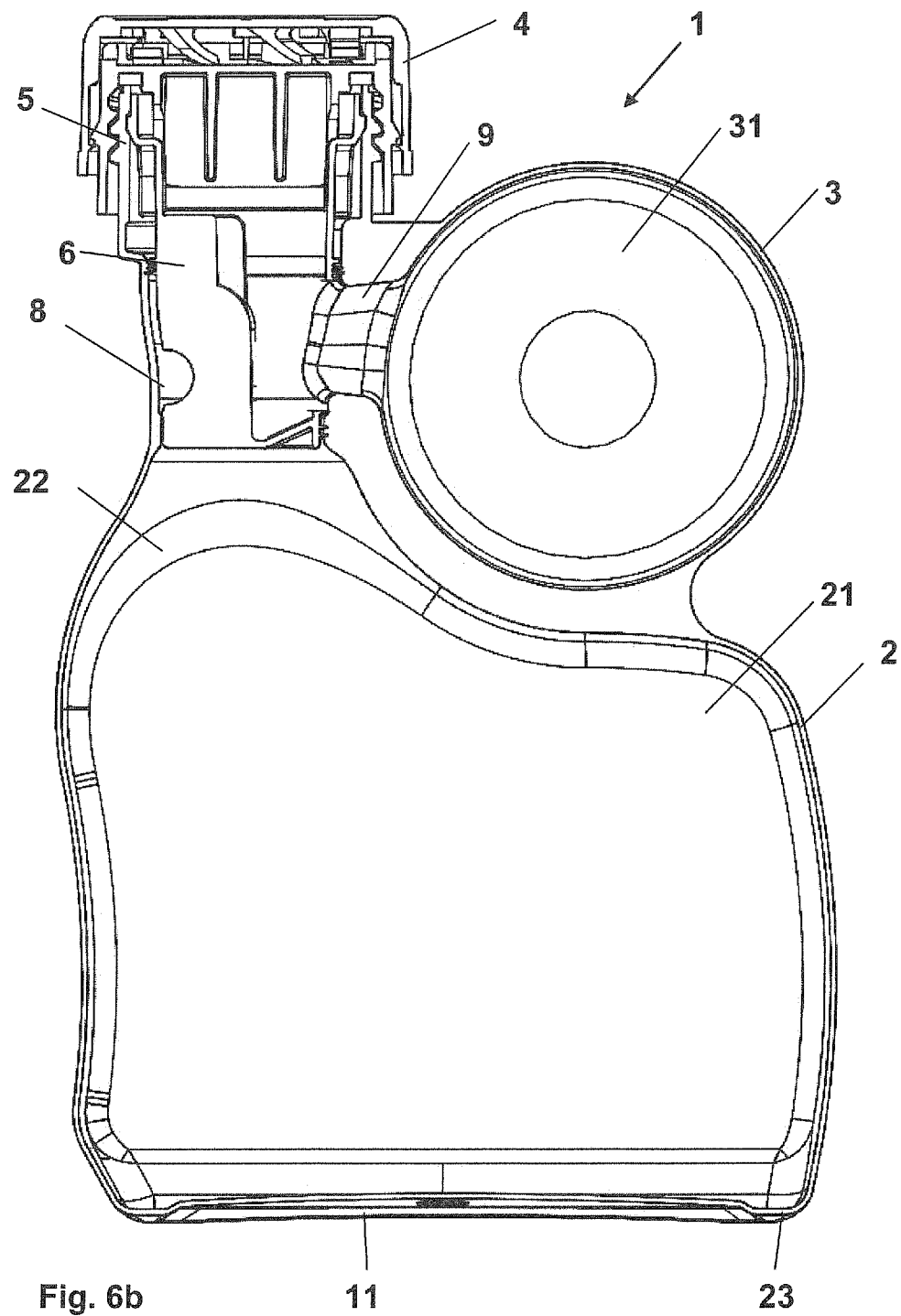

In this illustration of FIG. 6b, the valve 6 assumes its dispensing position. In the dosing position of the valve 6, the third opening 65 points in the direction of the dosing chamber 31 or of the connecting conduit 9. An opened outlet passage is formed by the third opening 65 in the valve 6, the first space in the inner space of the valve 6 divided by the partition wall 67, and the first opening 63 in the valve. At least a part of the filling material located in the dosing chamber 31 can come to the outlet 5 and the outlet opening 51 through the outlet passage from the dosing chamber 31. At the same time, the partition wall 67 of the valve 6 prevents the access of the filling material from the storage chamber 21 to the dosing chamber 31 and to the outlet 5, or vice versa.

In the dispensing position of the valve 6, the closure cap 4 is not locked with the outlet and can be removed in an appropriate manner by the user.

LIST OF REFERENCE NUMERALS

1 Dosing device
11 Supporting surface
2 Storage container
21 Storage chamber
22 Expanded portion
23 Corner
3 Dosing container
31 Dosing chamber
32 Fill level indicator
33 Cylinder axis
34 Corner area
35 End face
321 Marking line
322 Inscription
4 Closure member
5 Outlet
51 Outlet opening
53 External thread
6 Valve
61 Line
62 Line
63 First opening
64 Second opening
65 Third opening
66 Fourth opening
67 Partition wall
68 First end face
69 Second end face
691 Rim
70 Casing
71 Cut-out
72 Appendage
73 Line
731 Peripheral rim
74 Web
741 Edge
8 Valve seat
9 Connecting conduit

The invention claimed is:

1. A dosing device comprising
a storage container with a storage chamber for accommodating a filling material,
a dosing container with a dosing chamber,
an outlet with an outlet opening for dispensing the filling material, and
a valve,
wherein the valve is able to assume a dispensing position and a dosing position,
wherein the valve, in the dosing position, opens a dosing connection between the dosing chamber and the storage chamber and shuts an outlet passage from the dosing chamber to the outlet opening and the valve, in the dispensing position, shuts the dosing connection and opens the outlet passage,
wherein the dosing device further comprises
a valve seat for accommodating the valve with the valve seat having a cylindrical shape with a side surface, and
wherein a connecting conduit between the dosing container and the valve seat opens out into the side surface of the valve seat,
wherein the dosing device comprises a closure member, with which the outlet opening can be closed off,
wherein the closure member is coupled to the valve in such a way that rotation of the closure member displaces the valve between the dosing position and the dispensing position,
wherein the closure member is coupled to the valve and the outlet in such a way that rotation of the closure member locks the closure member with the outlet as long as the valve is in the dosing position and that rotation of the closure member unlocks the closure member with the outlet, when the valve is in the dispensing position.

2. The dosing device according to claim 1, wherein the valve is rotatably disposed in the valve seat of the dosing device.

3. The dosing device according to claim 2, wherein the closure member is configured as a rotary closure member and the closure member is non-rotatably connected to the valve.

4. The dosing device according to claim 2, wherein a rotary movement of the valve is limited by a protrusion or cut-out formed on the valve seat, which cooperates with a cut-out or a protrusion formed correspondingly in the valve.

5. The dosing device according to claim 3, wherein the closure member is provided with a first appendage or recess, which cooperates by positive fit in a direction of rotation with a second appendage or recess formed on the valve.

6. The dosing device according to claim 1, wherein the outlet has a substantially cylindrical shape, with a web extending in a circumferential direction being provided on the outlet, and the closure member being provided with a lug, which, at least in one position of rotation, latches behind the peripheral web for locking along a cylinder axis of the outlet.

7. The dosing device according to claim 1, wherein the storage chamber and the dosing chamber are arranged in such a way that at least a part of the filling material can be filled from the storage chamber into the dosing chamber by tilting the dosing device around a pivot axis.

8. The dosing device according to claim 1, wherein the valve has a casing comprising four openings divided into two pairs of openings, wherein the two openings within each pair are associated with one another so that through connections are formed within the casing only between those openings that are associated with one another.

9. The dosing device according to claim 8, wherein the valve has a cylindrical shape, so that the valve has a first and a second end face as well as the casing and an inner space, wherein the first end face comprises the first opening and the second end face comprises the second opening and the casing comprises the third and the fourth opening, and wherein a partition wall is disposed in an inner space.

10. The dosing device according to claim 9, wherein the inner space comprises a first and a second space, the first space being separated from the second space by the partition wall, and the first space being accessible from the outside of the valve through the first and the third opening, and the second space being accessible from the outside of the valve through the second and the fourth opening.

11. The dosing device according to claim 10, wherein the first space is not accessible from the outside through the second and the fourth opening, and the second space is not accessible from the outside through the first and the third opening.

12. The dosing device according to claim 1, wherein the storage container and the dosing container are formed as one piece.

13. The dosing device according to claim 1, wherein the dosing container comprises a fill level indicator.

14. The dosing device according to claim 1, wherein the closure member is configured as a rotary closure member, wherein simultaneous rotation of the rotary closure member and pressing down in the axial direction is required for unlocking.

15. The device of claim 13, wherein the dosing chamber has a cylindrical shape and the fill level indicator comprises at least one curved marking line with circular form which indicates a certain filling level of the filling material in the dosing chamber at different pivot angles.

16. The device of claim 15, wherein the filling level indicator comprises more than one curved marking line configured in the form of concentric partial circle sections.

* * * * *